US011957943B2

(12) United States Patent
Pally et al.

(10) Patent No.: US 11,957,943 B2
(45) Date of Patent: Apr. 16, 2024

(54) BLOCKING APPARATUS FOR A FIRE DAMPER, BLOCKING APPARATUS SYSTEM AND METHOD FOR BLOCKING A DRIVE DIRECTION

(71) Applicant: Siemens Schweiz AG, Zürich (CH)

(72) Inventors: Andreas Pally, Allenwinden (CH); Beat Kälin, Einsiedeln (CH)

(73) Assignee: SIEMENS SCHWEIZ AG, Zurich (CH)

( * ) Notice: Subject to any disclaimer, the term of this patent is extended or adjusted under 35 U.S.C. 154(b) by 518 days.

(21) Appl. No.: 17/284,459

(22) PCT Filed: Sep. 17, 2019

(86) PCT No.: PCT/EP2019/074831
§ 371 (c)(1),
(2) Date: Apr. 10, 2021

(87) PCT Pub. No.: WO2020/074220
PCT Pub. Date: Apr. 16, 2020

(65) Prior Publication Data

US 2021/0353985 A1 Nov. 18, 2021

(30) Foreign Application Priority Data

Oct. 11, 2018 (EP) .................................... 18199892

(51) Int. Cl.
*A62C 2/24* (2006.01)
*A62C 2/12* (2006.01)

(52) U.S. Cl.
CPC ................ *A62C 2/242* (2013.01); *A62C 2/12* (2013.01)

(58) Field of Classification Search
CPC ......... A62C 2/242; A62C 2/12; F16K 17/383; F24F 11/33

(Continued)

(56) References Cited

U.S. PATENT DOCUMENTS 3,580,321 A * 5/1971 Root ........................ A62C 2/16 160/310
4,161,204 A * 7/1979 Kurz ........................ A62C 2/16 160/1

(Continued)

FOREIGN PATENT DOCUMENTS

DE 19636350 A1 * 4/1997 ............... A62C 2/12
EP 0596275 A2 * 8/1993

(Continued)

OTHER PUBLICATIONS

Search Report for International Application No. PCT/EP2019/074831, 12 pages, dated Dec. 3, 2019.

*Primary Examiner* — Edelmira Bosques
*Assistant Examiner* — Frances F. Hamilton
(74) *Attorney, Agent, or Firm* — Slayden Grubert Beard PLLC

(57) ABSTRACT

Various embodiments include a blocking apparatus comprising: a holding apparatus; a receiving element mounted in the holding apparatus about an axis of rotation, defining a through-opening with a through-axis parallel to the axis of rotation; a wrap spring mechanically prestressed in the holding apparatus, with a winding arranged around the receiving element; and a thermocouple made of a material having a lower melting temperature than the holding apparatus and/or the wrap spring. The thermocouple holds at least one end of the wrap spring with respect to the holding apparatus in the prestressed state in such a way that the receiving element can be freely rotated in both drive directions about the axis of rotation. The receiving element is blocked in one of the two drive directions in the relaxed state of the wrap spring and in the triggered state of a thermal fuse.

14 Claims, 4 Drawing Sheets

(58) Field of Classification Search
USPC .......................................................... 454/369
See application file for complete search history.

(56) References Cited

U.S. PATENT DOCUMENTS

| | | | | | |
|---|---|---|---|---|---|
| 4,334,570 | A * | 6/1982 | Adams | ..................... | A62C 2/16 160/1 |
| 4,545,363 | A * | 10/1985 | Barchechat | ............ | A62C 2/247 126/285 B |
| 4,581,987 | A * | 4/1986 | Ulicny | ..................... | A62C 2/06 49/5 |
| 10,401,051 | B2 * | 9/2019 | Chopra | ................... | F24F 13/10 |
| 2007/0017738 | A1 * | 1/2007 | Truss | ....................... | A62C 2/12 181/209 |
| 2017/0065839 | A1 * | 3/2017 | Weber | ................... | F16K 31/055 |

FOREIGN PATENT DOCUMENTS

| | | | | |
|---|---|---|---|---|
| EP | 1 035 307 | | 9/2000 | ................ F01P 7/16 |
| EP | 1762276 | A2 * | 3/2007 | ............. A62C 2/242 |
| EP | 3834892 | A1 * | 6/2021 | ............... A62C 2/12 |
| GB | 2211599 | A * | 7/1989 | ............... A62C 2/14 |
| GB | 2 468 292 | | 9/2010 | .............. F24F 13/14 |

* cited by examiner

BLOCKING APPARATUS FOR A FIRE DAMPER, BLOCKING APPARATUS SYSTEM AND METHOD FOR BLOCKING A DRIVE DIRECTION

CROSS-REFERENCE TO RELATED APPLICATIONS

This application is a U.S. National Stage Application of International Application No. PCT/EP2019/074831 filed Sep. 17, 2019, which designates the United States of America, and claims priority to EP Application No. 18199892.3 filed Oct. 11, 2018, the contents of which are hereby incorporated by reference in their entirety.

TECHNICAL FIELD

The present disclosure relates to fire dampers. Various embodiments may include blocking apparatuses, blocking apparatus systems containing a blocking apparatus, and/or associated methods.

BACKGROUND

Hitherto, wrap springs have generally been used as free-wheel couplings.

SUMMARY

The teachings of the present disclosure include simply constructed blocking apparatuses, in particular for a drive element for activating a fire damper. In particular, it should be possible to comply with all fire protection regulations and the blocking apparatus should in particular still block when a drive apparatus activating the drive element is no longer functional or no longer present, for example because it has melted in a fire. As an example, some embodiments of the present disclosure include a blocking apparatus (10, 10*b*), in particular for a fire damper (114, 120), comprising: a holding apparatus (150), a receiving element (230) which is rotatably mounted in the holding apparatus (150) about an axis of rotation (A) and has a through-opening (250), the through-axis of which is coaxial or parallel to the axis of rotation (A), a wrap spring (130, 130*b*) of the blocking apparatus (10, 10*b*) which is held mechanically prestressed in the holding apparatus (150), and of which at least one winding (W) is arranged around the receiving element (230), and containing at least one thermocouple (140, 142), made of a material having a lower melting temperature than the material having the lowest melting temperature in the holding apparatus (150) and/or than the melting temperature of the material of the wrap spring (130, 130*b*), wherein the at least one thermocouple (140, 142) holds at least one end (132, 134) of the wrap spring (130, 130*b*) with respect to the holding apparatus (150) in the prestressed state in such a way that the receiving element (230) can be freely rotated in both drive directions (160, 170) about the axis of rotation (A) and that the receiving element (230) is blocked in one of the two drive directions (170) in the relaxed state of the wrap spring (130, 130*b*) and in the triggered state of the at least one thermal fuse (140, 142).

In some embodiments, the at least one thermocouple (140, 142) is made of a plastic material or of a solder having a melting temperature lower than 400 degrees Celsius, wherein the holding apparatus (150) is preferably made of steel and/or of at least one sintered material, wherein the wrap spring (130, 130*b*) is made of steel, wherein the receiving element (230) is preferably made of a sintered material, and wherein preferably the difference between the melting temperatures is at least 200 degrees Celsius, at least 500 degrees Celsius or at least 1000 degrees Celsius.

In some embodiments, a single thermocouple (140) is provided which holds both ends (132, 134) of the wrap spring (130, 130*b*) in the prestressed state with respect to the holding apparatus (150) or which holds the one end (134) of the wrap spring (130, 130*b*) in the prestressed state with respect to the holding apparatus (150), wherein the other end (132) of the wrap spring (130, 130*b*) is fixed to the holding apparatus (150), or wherein two thermocouples (140, 142) are provided, each of which holds one end (132, 134) of the wrap spring (130, 130*b*) in the prestressed state with respect to the holding apparatus (150).

In some embodiments, the holding apparatus (150) has at least two housing plates (200, 202) which are spaced apart from one another and which each have through-openings (201, 203) in the region of the axis of rotation (A), and wherein the holding apparatus (150) has at least one spacer element (204 to 208), a plurality of cylindrical spacer elements (204 to 208), through which the housing plates (200, 202) are arranged at a distance (AS) with respect to one another defined by the at least one spacer element (204 to 208).

In some embodiments, one of the housing plates (200) contains a circular through-opening (201) in which the receiving element (230) is mounted with a slide bearing.

In some embodiments, there is a retaining element (240) which is hollow-cylindrical or essentially hollow-cylindrical in design and which is firmly mounted, in particular not rotatably, at one end in an opening (203) of the other housing plate (202), wherein the retaining element (240) is surrounded by at least one winding (W) of the wrap spring (130, 130*b*).

In some embodiments, the retaining element (240) is designed at its other end as a counter bearing for rotatably receiving the receiving element (230), in particular as a slide bearing, wherein, at the contacting ends of the receiving element (230) and the retaining element (240), in each case an edge (K2, K3) or undercut (K2, K3) set back in the circumferential direction is formed on a projection, and wherein the projections overlap viewed in a radial direction (R).

In some embodiments, an edge (K1, K4) or undercut (K1, K4) set back in the circumferential direction is also formed on a respective projection at the other end of the receiving apparatus (230) and/or holding apparatus (240).

In some embodiments, the receiving element (230), viewed in the direction of the axis of rotation (A), has the same length (L1) as the length (L1) of the holding apparatus (240) or these lengths (L1, L2) differ by at most 30 percent with respect to the sum of the two lengths (L1, L2), the receiving element (230) preferably has a smaller external diameter (D1) than the external diameter (D2) of the holding apparatus (240), preferably an external diameter (D1) which is smaller in the range of 0.1 millimeter to 0.5 millimeter, and the receiving element (230) preferably has an opening (320) with a square cross-section, with a triangular cross-section or with a cross-section with more than four corners transversely to the axis of rotation.

In some embodiments, the wrap spring (130, 130*b*) contains at least 5 or at least 10 windings (W), fewer than 25 windings, the ends (132, 134) of the wrap spring (130, 130*b*) are prestressed in the range of 5 angular degrees to 45 angular degrees with respect to one another, the wrap spring (130, 130*b*) has a square cross-section, a rectangular cross-section, or a circular cross-section, and the wrap spring (130, 130*b*) is a helical spring with closely adjacent windings (W).

In some embodiments, at least one of the thermocouples (140) or both thermocouples (140, 142) is or are held between two housing plates (200, 202) or, between the housing plates (200, 202), at least one of the thermocouples (140, 142) has an elongated shape compared to its largest lateral dimension, with a length which is at least three times or at least five times longer than the largest lateral dimension, and a groove (300) extending in a straight line is provided in at least one of the thermocouples (140, 142) for receiving one end (132, 134) or both ends (132, 134) of the wrap spring (130, 130*b*).

In some embodiments, there is a blocking apparatus (10, 10*b*) as described herein and at least one fire damper (114, 120), the blocking apparatus (10*b*) is arranged on a drive element (112, 112*b*) of the at least one fire damper 114, 120), and the fire damper (114, 120) is to be kept closed in the event of a fire.

In some embodiments, a drive apparatus (100, 500) is arranged on the drive element (112), which has a housing (502, 504) made of a material which has a melting temperature lower than 800 degrees Celsius or lower than 600 degrees Celsius, in particular containing aluminum or comprising aluminum or an aluminum alloy.

As another example, some embodiments include a method for blocking a drive direction (170), in particular in a drive element (112, 112*b*) for a fire damper (114, 120), comprising: arranging a wrap spring (130, 130*b*) around a drive shaft (112, 112*b*) which is driven by a drive unit (100), wherein the wrap spring (130, 130*b*) is prestressed using at least one thermocouple (140, 140*b*, 142), wherein the thermocouple (140, 140*b*, 142) is designed, in the event of a fire or in the event of overheating of a machine, to decrease in strength or to melt, with the prestressed wrap spring relaxing as a result, wherein the material of the thermocouple (140, 140*b*, 142) has a lower melting temperature compared to the melting temperature of the wrap spring (130, 130*b*), wherein the relaxed wrap spring (130, 130*b*) has a smaller internal diameter than the prestressed wrap spring (130, 130*b*), wherein the wrap spring (130, 130*b*), due to the reduced internal diameter, blocks (180) the rotation of the drive shaft (112) in one direction of rotation (170) or makes it considerably more difficult, and allows it in the other direction of rotation (160) or blocks it less than in the first direction of rotation (170), and wherein in the method a blocking apparatus (10, 10*b*) or a blocking apparatus system (1) as described herein is used.

Features and details which are described in connection with the blocking apparatus incorporating the teachings herein also apply, of course, in connection with the blocking apparatus systems or the methods for blocking a drive direction and vice versa in each case, so that with respect to disclosure, reference is or can always be made to the individual aspects alternately.

BRIEF DESCRIPTION OF THE DRAWINGS

Further advantages, technical effects, features, and details of the teachings herein and of developments result from the following description in which an exemplary embodiment is described in detail with reference to the drawings, in which, in a diagrammatic view.

DETAILED DESCRIPTION

Figure 1:
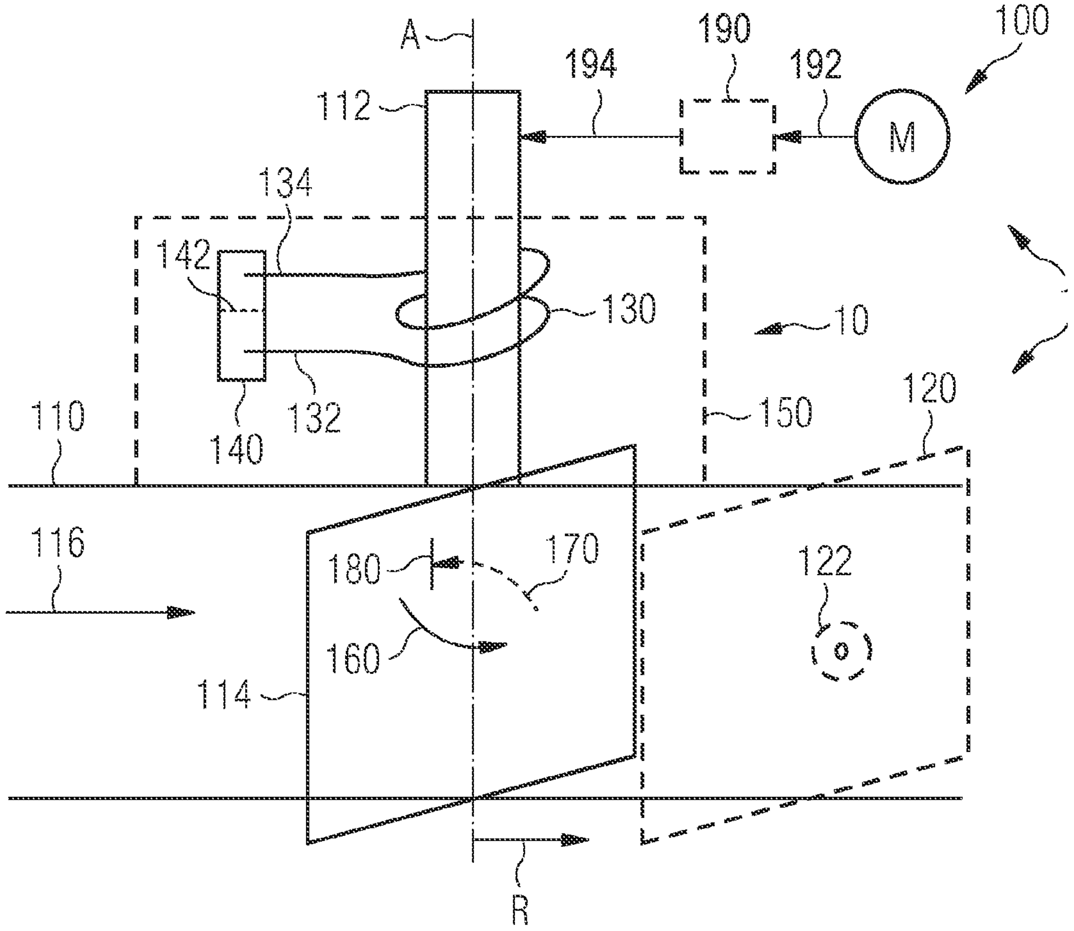
FIG. 1 shows a schematic sketch of a system with a blocking apparatus or coupling incorporating teachings of the present disclosure.

In some embodiments, a blocking apparatus, in particular for a fire damper, has:

a holding apparatus, a receiving element which is mounted in the holding apparatus so as to be rotatable about an axis of rotation and having a through-opening, the through-axis of which runs parallel, in particular coaxially, to the direction of the axis of rotation, a mechanically prestressed wrap spring of the blocking apparatus held in the holding apparatus, the at least one winding of which is arranged around the receiving element, and comprising at least one thermocouple produced from a material having a lower melting temperature than the material having the lowest melting temperature in the holding apparatus and/or than the melting temperature of the material of the wrap spring, the at least one thermocouple holding at least one end of the wrap spring in the prestressed state with respect to the holding apparatus in such a way that the receiving element is freely rotatable about the axis of rotation in both drive directions, and that the receiving element is blocked in one of the two drive directions in the relaxed state of the wrap spring and in the triggered state of the at least one thermal fuse.

The thermocouple can also be referred to as a fastening facility. In the triggered state of the thermocouple, in particular in the event of a fire, the material of the thermocouple melts and loses its mechanical strength. However, the other load-bearing components of the blocking apparatus continue to fulfill their function unchanged. In normal operation, i.e., in the non-triggered state of the thermocouple, the thermocouple has such a high mechanical strength that one end of the wrap spring or both ends of the wrap spring are held in the prestressed state with respect to the holding apparatus.

In some embodiments, the freewheeling principle with a wrap spring is thus combined with thermal activation of the freewheeling function or the function of blocking in the blocking direction. A trigger mechanism for the locking function of the freewheel can be activated in a simple manner solely on the basis of the material parameters.

In some embodiments, the thermocouple can be made of a plastic material or of a solder having a melting temperature lower than 400 degrees Celsius. The holding apparatus can be made of steel and/or of at least one sintered material. The difference in the melting temperatures can thus be ensured in a simple manner. Steel and sintered materials typically have melting temperatures greater than 1000 degrees Celsius.

In some embodiments, the wrap spring can be made of steel. The receiving element can also be made of a sintered material. This ensures that although the thermocouple melts in the event of a fire, as a result of which the locking function and the freewheeling function of the wrap spring are activated, the other load-bearing components of the blocking apparatus can continue to fulfill their function unchanged.

In some embodiments, the difference in melting temperatures can be at least 200 degrees Celsius, at least 500 degrees Celsius or at least 1000 degrees Celsius. This ensures that the locking function is reliably triggered in the event of a fire. The functional principle can also be used for other applications, for example as overload protection when a machine overheats.

In some embodiments, the holding apparatus can contain at least two plates which are spaced apart from one another and each have through-openings in the region of the axis of rotation. The holding apparatus can contain at least one spacer element, e.g. a plurality of cylindrical spacer elements, by means of which the plates are arranged at a distance from one another defined by the at least one spacer element. It is thus possible to use a laterally open housing which is simpler to produce in comparison with a closed housing, in particular more material is saved. A reduced weight is also obtained.

In some embodiments, fastening holes are provided in both plates, in particular in the case of otherwise structurally identical plates, or at least in one of the plates with which the blocking apparatus can be mounted, in particular on a ventilation system, ventilation or venting, for example, through-holes for screws.

In some embodiments, one of the plates can contain a circular through-opening in which the receiving element is mounted, preferably with a slide bearing. The slide bearing can be realized in a simple and cost-effective manner. In some embodiments, the receiving element can pass through completely and also be mounted with its other end in the other plate, again in particular by means of a slide bearing. This would obviate the need for the retaining element described below. This alternative can be used when only one end of the wrap spring is prestressed in a thermocouple and the other end is, for example, firmly attached to the holding apparatus.

In some embodiments, the blocking apparatus can contain a retaining element which is hollow-cylindrical or essentially hollow-cylindrical in design and which may be firmly mounted, in particular not rotatably, at one end in an opening of the other plate. The retaining element can be surrounded by at least one winding of the wrap spring. The retaining element can be dimensioned in such a way that a part of the relaxed wrap spring is securely wrapped around the retaining element due to the reduction of its internal diameter, so that the other part can fulfill the freewheeling effect with locking function on the receiving element. This variant can also be used if both ends of the wrap spring are prestressed in the thermocouple and are exposed after the thermocouple has melted.

In some embodiments, at its other end, the retaining element can be designed as a counter bearing for the rotatable receiving of the receiving element, in particular as a slide bearing. An edge which is set back or concave in the circumferential direction or a so-called undercut can be formed on a projection on each of the contacting ends of the receiving element and the retaining element. The projections formed by the undercuts can overlap in the radial direction, resulting in a reliable form fit which ensures a good hold in the radial direction and in the axial direction.

At the other end of the receiving apparatus and/or holding apparatus as well, an edge or undercut which is set back in the circumferential direction or concave can be formed on a respective projection. This provides a secure hold and a good mounting as a slide bearing or as a fixed bearing. Here too, the form fit provides a good hold in the radial direction and in the axial direction.

Viewed in the direction of the axis of rotation, the receiving element can have the same length as the length of the holding apparatus. In some embodiments, these lengths can differ by at most 30 percent based on the sum of both lengths. This results in a retaining element with a sufficiently large retaining surface for the relaxed wrap spring with a sufficiently large receiving element for a drive shaft. On the receiving element too, the target for the relaxed wrap spring is sufficiently large to fulfill the freewheeling function and the locking function.

The receiving element can have a smaller external diameter compared to the external diameter of the holding apparatus, e.g. an external diameter which is smaller in the range of 0.1 millimeter to 0.5 millimeter. On the one hand, this enables a secure hold of the relaxed wrap spring on the retaining element and, on the other hand, a hold on the receiving element which is not too tight for the drive shaft.

In some embodiments, the receiving element can have an opening with a square cross-section, with a triangular cross-section or a cross-section with more than four corners transversely to the axis of rotation. Thus, a drive shaft with a matching counter-form can engage in the receiving element in a torsion-resistant manner. However, round cross-sections and round drive shafts can also be used if torsional stability is ensured by other measures.

In some embodiments, the operating principle of the blocking apparatus when the wrap spring is relaxed is that, in the event of a torque in the blocking direction, frictional forces act in the coiling direction or in the winding direction of the windings of the wrap spring. This leads to a reduction in the diameter of the relevant winding, e.g. the loop is contracted. Self-braking occurs as a result of further winding. In the other direction of rotation of the drive shaft, the frictional forces act counter to the winding direction, so that the diameter of the relaxed wrap spring increases again somewhat. As a result, no self-braking occurs in this direction, which is therefore also referred to as the freewheeling direction.

In some embodiments, the wrap spring may contain at least 5 or at least 10 windings, and/or fewer than 25 windings. This results in simple production with a reliable freewheel and locking function. The ends of the wrap spring can be prestressed in the range of 5 angular degrees to 45 angular degrees with respect to one another. Only a small amount of installation space need thus be provided for the movement of the ends when the wrap spring is relaxed. The wrap spring can have a square cross-section, a rectangular cross-section or a circular cross-section and is thus of simple design. The wrap spring can be a helical spring with closely adjacent windings, permitting a compact design. In some embodiments, intermediate spaces can be arranged between adjacent windings.

At least one thermocouple or both thermocouples can be held between the plates. At least one thermocouple can have an elongated shape compared to its largest lateral dimension, e.g. it may have a length at least three times or at least five times longer than the largest lateral dimension of the thermocouple.

In some embodiments, a groove running in a straight line can be provided in the thermocouple and can be provided for receiving one end or both ends of the wrap spring. The thermocouple can also be used on its own because it can also be supplied as an individual part.

In some embodiments, a blocking apparatus system is arranged on a drive element of at least one fire damper. In the event of a fire, the fire damper can operate as a fire damper which is to be kept closed as far as possible and may under no circumstances be opened again. In some embodiments, the fire damper is an element in addition to a ventilation damper in the same ventilation duct, the ventilation damper being used for controlling or regulating an air flow. The fire damper, on the other hand, is only activated in the event of a fire or for checking purposes. In some embodiments, during normal operation, the fire damper can operate as a ventilation damper which controls or regulates an air flow of a ventilation or venting system.

All the technical effects and advantages described in detail above with regard to the blocking apparatus or its developments can thus also be provided by the blocking apparatus system, in which this blocking apparatus is used.

In the blocking apparatus system, a drive apparatus can be arranged on the drive element which has a housing made of a material that has a melting temperature lower than 800 degrees Celsius or lower than 600 degrees Celsius, in particular containing aluminum or consisting of aluminum or an aluminum alloy. Even if the In some embodiments, the drive apparatus closes the fire damper in the event of a power failure, for example within 15 seconds of power failure. A return spring of the drive apparatus can then provide a holding torque. If the drive apparatus itself no longer develops any holding torque which keeps the fire damper closed, for example due to being destroyed by a fire, the blocking apparatus keeps the fire damper securely closed, however, as explained in detail above. Thus, smoke cannot spread in the building ventilation system and the life of people in rooms remote from the fire site is not endangered.

Some embodiments include a method for blocking a drive direction, in particular for blocking a drive direction in a drive element for a fire damper. In the method, a wrap spring is arranged around a drive shaft, which is driven by a drive unit. In addition:

- the wrap spring is or will be prestressed using at least one thermocouple,
- in the event of a fire or in the event of overheating of a machine, the thermocouple is intended to decrease in strength or to melt, whereby the prestressed wrap spring would relax,
- the material of the thermocouple has a lower melting temperature compared to the melting temperature of the wrap spring,
- the relaxed wrap spring has a smaller internal diameter than the prestressed wrap spring,
- and, due to the reduced internal diameter, the wrap spring blocks or substantially impedes the rotation of the drive shaft in one direction and permits or blocks the rotation of the drive shaft in the other direction less than in the first direction.

All technical effects and advantages which have been described in detail above with regard to the blocking apparatus therefore also apply to the methods described herein, in which the blocking apparatus can be used. In the methods described, the drive shaft can be brought into mechanical operative connection with at least one fire damper. In some embodiments, the fire damper is an element in addition to a ventilation damper in the same ventilation duct, the ventilation damper being used for controlling or regulating an air flow. The fire damper, on the other hand, is only activated in the event of a fire or for checking purposes. In some embodiments, during normal operation, the fire damper can operate as a ventilation damper which controls or regulates an airflow of a ventilation or venting system.

The secure closure of the fire damper is ensured in a simple manner by the functional principle employed, thermal activation of a wrap spring freewheel with blocking in the opposite direction. It is still possible to close the damper completely but opening of the damper is counteracted.

In other words, a coupling with a temperature-dependent unidirectional locking function for fire dampers is described. In the event of a fire, the damper is closed by a drive within approx. 15 seconds in a contemporary fire damper. Normally, for example, the drive burns in the following 2 minutes to 60 minutes. All parts which are not made of steel melt and fall off the damper shaft. Without a drive on the damper shaft, there is no longer any holding torque on the damper and the damper could open unintentionally. The unintentional opening of a damper in the event of a fire must be prevented.

The solution could be placed in the actuator. A feather key made of metal could be pivoted onto the metal segment by means of a "safety fuse". The key geometry would then be designed in such a way as to permit the segment to still close at any time but no longer open.

Figure 2:
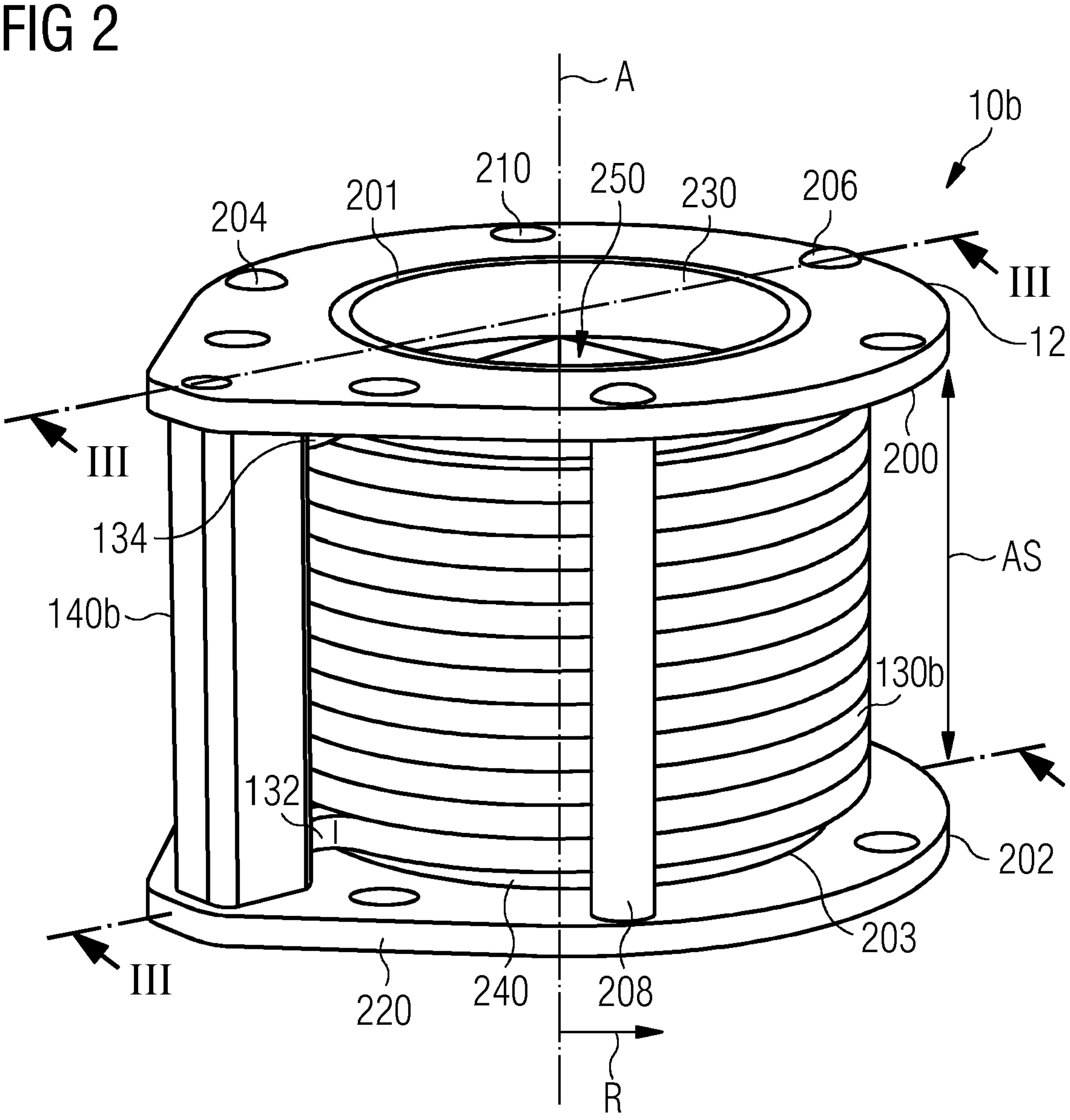
FIG. 2 shows a blocking apparatus in oblique view.
Figure 3:
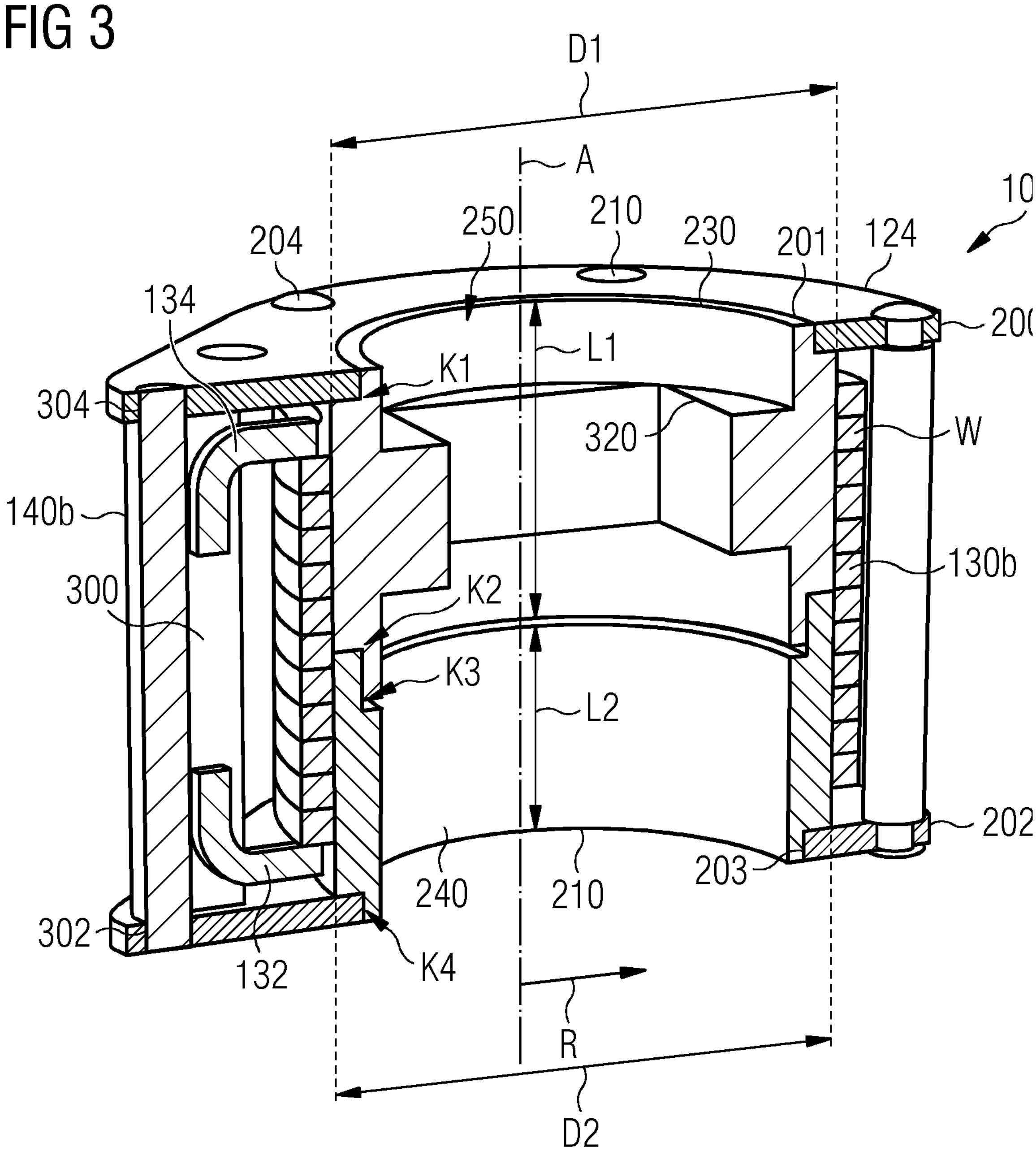
FIG. 3 shows a cross-section through the blocking apparatus shown in FIG. 2 along section plane 3-3 according to FIG. 2.
Figure 4:
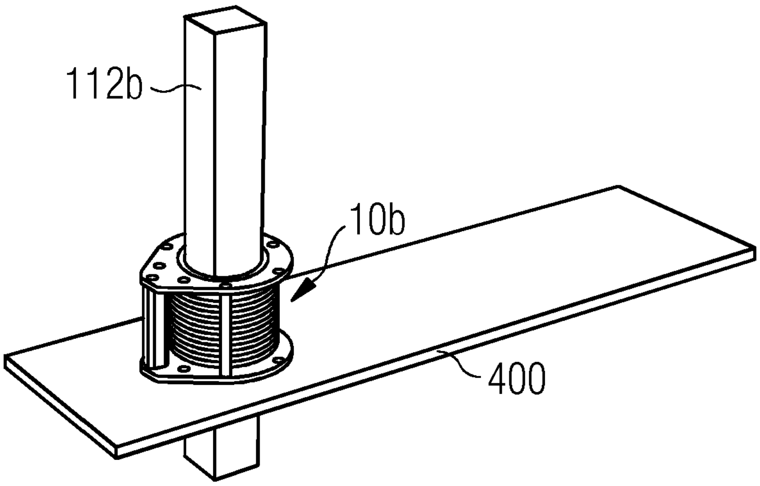
FIG. 4 shows the blocking apparatus or coupling which is mounted on a metal sheet of a damper.

As shown in FIGS. 1 to 5, the solution can also be executed separately by the actuator. The proposed coupling with a temperature-dependent, unidirectional locking function is pushed onto the damper shaft and fixed to the damper housing. The coupling permits bidirectional movement by the actuator during normal operation. In the event of a fire, the plastic of the "thermal fuse" of the coupling melts away. At this moment, the wrap spring closes, and then the coupling can only be turned in one direction. In the opposite direction, the wrap spring blocks rotational movement. In FIGS. 2 and 3, the coupling is shown with a unidirectional locking function. In FIG. 4, the coupling is already mounted and fixed on the damper. According to FIG. 5, the actuator is mounted on the damper as well as on the coupling.

The architecture or the materials of the actuator used are free of the locking function. Nevertheless, the damper remains locked. Production costs for the actuator can be saved as a result. The new coupling with a temperature-dependent, unidirectional locking function can be purchased by the customer as an additional module. If the function is needed, the customer buys it in addition. Otherwise, he saves expenditure on an unnecessary function.

FIG. 1 shows a schematic sketch of a blocking apparatus system 1 with a blocking apparatus 10 or coupling incorporating teachings of the present disclosure. The blocking apparatus system 1 is, for example, part of a comprehensive building infrastructure, which is controlled, for example, in accordance with the BACnet (Building Automation and Control Networks) standard. The blocking apparatus 10 can also be referred to as a thermally switched freewheeling apparatus or coupling. The blocking apparatus system 1 furthermore includes: an actuator apparatus 100, a ventilation duct 110, and a drive shaft 112.

A fire damper 114 can be arranged in the ventilation duct 110, for example if a longitudinal section through the ventilation duct is shown, see arrow 116, which indicates an air movement in this case. The fire damper 114 can, for example, have a square or a circular shape, and the cross-section of the ventilation duct 110 is adapted accordingly. Ventilation dampers (not shown) which are used for controlling or regulating an air flow during normal operation of the ventilation system, when there is no fire in a building, in an underground car park or other building infrastructure, can be or are arranged elsewhere in the ventilation duct 110.

In some embodiments, a plurality of fire dampers 114, 120 can also be arranged in the ventilation duct 110, for example when the ventilation duct 110 is shown in a cross-section in FIG. 1, see arrow 122 in this case, which indicates an air flow that is directed toward the observer. The same applies to the ventilation duct 110 accordingly. The actuator apparatus 100 may include a single-stage or multi-stage transmission 190 which is driven by the motor, see arrow 192. The transmission output of the transmission is connected to the drive shaft 112, see arrow 194.

The following components of the blocking apparatus 10 are arranged in an open housing or in a holding apparatus 150: a wrap spring 130, spring ends 132, 134 of the wrap spring 130, a thermocouple 140, and/or a plurality of thermocouples 140, 142.

The thermocouple 140 receives the ends 132, 134 of the wrap spring 130, the wrap spring 130 being prestressed, which increases its internal diameter somewhat compared to the relaxed state, so that during normal operation the drive shaft can essentially rotate unimpeded in both drive directions or directions of rotation 160 and 170. During normal operation, there is therefore no blocking 180 in the opposite direction or in the direction of rotation 170.

With respect to the functional principle of the blocking apparatus 10 in the event of a fire, reference is made to the introduction, in particular to the melting of the thermocouple 140 or the thermocouples 140, 142, to the mechanical relaxation of the wrap spring 130, the associated reduction in diameter and the freewheeling effect in the direction of rotation 160, i.e. in a direction of rotation in which the fire damper 114, 120 is closed, and blocking 180 in the opposite direction 170, i.e. in a direction of rotation in which the fire damper 114, 120 would be opened.

FIG. 1 also shows an axis of rotation A, around which the drive shaft 112 rotates, which has a suitable cross-sectional shape transverse to the axis of rotation. Furthermore, a radial direction R with respect to the axis of rotation A is shown.

FIG. 2 shows an oblique view of a blocking apparatus 10*b*. The blocking apparatus 10*b* is a special embodiment of the blocking apparatus 10 and contains, for example: a wrap spring 130*b* as a special embodiment of the wrap spring 130, and a thermocouple 140*b* as a special embodiment of the thermocouple 140.

The housing or the holding apparatus 150 is now designed as an open housing having: an upper housing plate 200 with a through-opening 201, a lower housing plate 202 with a through-opening 203, and with spacer pins 204 to 208.

In the upper housing plate 200 there are upper mounting holes 210. In the lower housing plate 202 there are lower mounting holes 220. The installation direction can thus be selected according to requirements.

In the upper part of the blocking apparatus 10*b*, a receiving element 230 can be seen which receives the drive shaft 112 or another drive shaft. The receiving element 230 is explained in more detail below with reference to FIG. 3.

In the lower part of the blocking apparatus 10*b*, a retaining element 240 can be seen which is firmly connected to the lower housing plate 202 and on which the receiving element 230 and, in the relaxed state of the wrap spring 130*b*, also the wrap spring 130*b* is held or supported. The retaining element 240 is also explained in more detail below with reference to FIG. 3.

FIG. 2 also shows a through-opening 250 through which the drive shaft 112 can extend through the entire blocking apparatus 10*b*. There is a distance AS between the housing plates 200 and 202 and this is set by the spacer elements 208.

FIG. 3 shows a cross-section through the blocking apparatus shown in FIG. 2 along section plane 3-3 according to FIG. 2. A longitudinal groove 300 in the thermocouple 140*b* can be clearly seen. The two ends 132 and 134 are mounted in the longitudinal groove 300, the wrap spring 130*b* being prestressed. In some embodiments, only one end 132 or 134 can be mounted in the thermocouple 140*b*. The other end is then curved, for example, in the other direction compared to the direction of curvature shown in FIG. 3 and fixed to the lower housing plate 202 in the case of the end 132, or to the upper housing plate in the case of the end 134, for example in an opening or bore to be provided for this purpose. In some embodiments, instead of the thermocouple 140*b*, two adjacent thermocouples can also be provided, each of which receives an end 132 or 134 of the wrap spring 130*b*.

The receiving element 230 is essentially cylindrical with an opening 320 which, in the example, can receive a square drive shaft 112 or 112*b*, in particular with a square cross-section. The receiving element 230 has a circumferential concave edge or undercut K1 on its upper edge and a circumferential concave edge or undercut K2 on its lower edge or end. An internal projection is formed by the edge K1 and is mounted with a sliding fit in the through-opening 201 of the upper housing plate 200.

The retaining element 240 is hollow-cylindrical or essentially hollow-cylindrical with an internal diameter which corresponds to the internal diameter on the receiving element 230. The retaining element 240 has an upper circumferential concave edge or undercut K3 on its upper edge and a circumferential concave edge or undercut K4 on its lower edge or end. An internal projection is formed by the edge K4, which projection is firmly mounted, for example, with a press fit or even welded, in the opening 203 of the lower housing plate 202.

An internal projection is formed by the edge K2, which projection is mounted with a sliding fit on the retaining element 240 and overlaps with an external projection on the retaining element 240 in the radial direction R, the projection being formed by the edge K3. As can also be seen in FIG. 3, the thermocouple 140*b* is received in the lower housing plate 202 in a lower receiving opening 302 and in the upper housing plate 200 in a receiving opening 304.

For the external diameter D1, D2 of the receiving element 230 or of the retaining element 240, the dimensions specified in the introduction apply, e.g. the external diameter D1 of the receiving element 230 can be selected to be somewhat smaller than the external diameter D3 of the retaining element 240.

A winding W of the wrap spring 130*b* is shown in FIG. 3. In the example, the wrap spring 130*b* has approximately 12 windings W. A length L1 of the receiving element 230 is selected, for example, to be approximately or exactly the same as a length L2 of the retaining element 240. The sum of the lengths L1 and L2 approximately corresponds to the distance AS shown in FIG. 2, for example.

FIG. 4 shows the blocking apparatus 10*b* or coupling mounted on a metal sheet of a damper. A mounting plate 400 is, for example, part of a ventilation duct 110 or part of a housing for one or more fire dampers 114, 120. The blocking apparatus 10*b* is, for example, screwed to the mounting plate with screws, which are also inserted through the holes 203.

Figure 5:
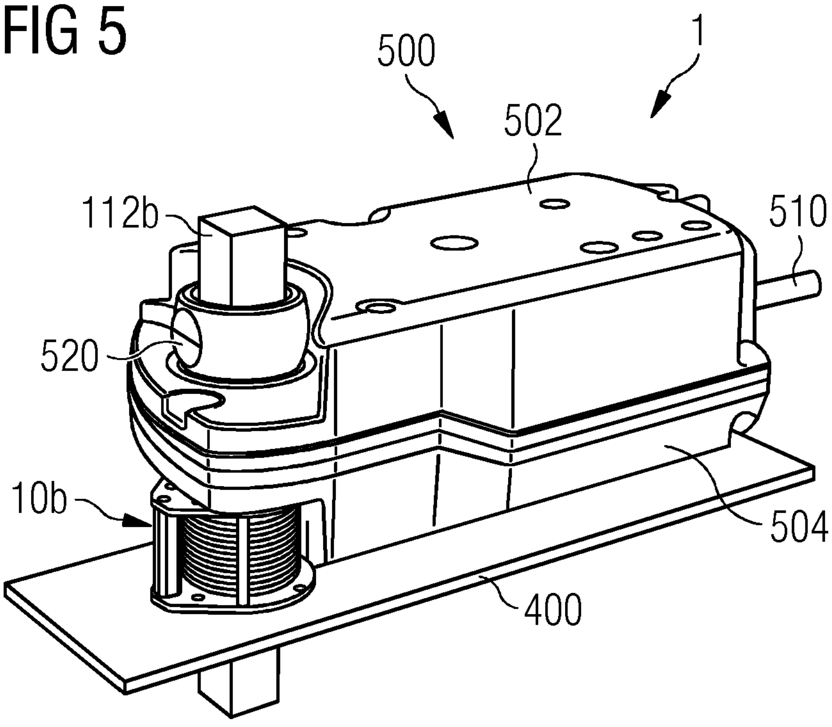
FIG. 5 shows the blocking apparatus system with an actuator unit mounted on the damper.

FIG. 5 shows the blocking apparatus system 1 with the actuator unit 500 mounted on the damper. The actuator unit 500 contains, for example, two housing halves 502, 504, which are made, for example, of aluminum or an aluminum alloy. In particular, the units explained with reference to FIG. 1 are contained in the housing halves 502, 504, motor M, transmission 190, and possibly also an electronic control unit. A connection or control line 510 supplies the actuator unit 500 with an operating voltage and/or with suitable control signals for activating the motor M, i.e. for opening and closing the fire damper(s) 114, 120. A fastening element 520 is used to fasten the actuator unit 500 on the drive shaft 112*b*. Moreover, with respect to the function of the system in the event of a fire, reference is made to the introduction, e.g. in particular secure retention of the fire damper(s) even when the actuator unit 500 is without power or is even completely destroyed, for example as a result of melting due to high temperatures in the event of a fire.

The exemplary embodiments shown in the Figures are not true to scale and not restrictive. Modifications within the framework of professional action are possible. Although the teachings herein have been illustrated and described in more detail by the exemplary embodiment, the scope of the disclosure is not limited by the disclosed examples, and other variations can be derived therefrom by a person skilled in the art without departing from the scope of the disclosure. The developments and embodiments mentioned in the introduction can be combined with one another. The exemplary embodiments mentioned in the description of the figures can likewise be combined with one another. Furthermore, the developments and embodiments mentioned in the introduction can be combined with the exemplary embodiments mentioned in the description of the figures. If the word "can" is used, the possibility of realization exists or, alternatively, technical realization is actually implemented.

LIST OF REFERENCE CHARACTERS

1 Blocking apparatus system
10, 10*b* Blocking apparatus
100 Actuator apparatus
110 Ventilation duct
112, 112*b* Drive shaft
114, 120 Fire damper
116, 122 Arrow
190 Transmission
122, 124 Arrow
130, 130*b* Wrap spring
132, 134 Spring end
140, 140*b* Thermocouple
142 Alternative thermocouple
150 Holding apparatus
160 Direction of rotation (close)
170 Direction of rotation (open)
180 Blocking
M Motor
A Axis of rotation
AS Distance
R Radial direction
200, 202 Upper or lower housing plate
201, 203 Through-opening
204 to 208 Spacer pins
210, 220—Upper or lower mounting holes
230 Receiving element
240 Retaining element
250 Through-opening
3-3 Section plane
300 Longitudinal groove
302, 304 Lower or upper receiving opening
D1, D2 Outer diameter
320 Opening
W Winding
K1 to K4 Concave edge or undercut
L1, L2 Length
400 Mounting plate on ventilation duct
500 Actuator unit
502, 504 Housing half
510 Connection/control line
520 Fastening element

What is claimed is:

1. A blocking apparatus comprising:

a holding apparatus;

a receiving element rotatably mounted in the holding apparatus about an axis of rotation, the receiving element defining a through-opening with a through-axis coaxial or parallel to the axis of rotation;

a wrap spring held mechanically prestressed in the holding apparatus, with at least one winding arranged around the receiving element; and a thermocouple made of a material having a lower melting temperature than a lowest melting temperature in the holding apparatus and/or than a melting temperature of the wrap spring;

wherein the thermocouple holds at least one end of the wrap spring with respect to the holding apparatus in the prestressed state in such a way that the receiving element can be freely rotated in both drive directions about the axis of rotation; and the receiving element is blocked against movement in one of the two drive directions in the relaxed state of the wrap spring and in the triggered state of a thermal fuse.

2. The blocking apparatus as claimed in claim 1, wherein:

the thermocouple comprises a plastic material or a solder having a melting temperature lower than 400 degrees Celsius;

the holding apparatus comprises a steel and/or a sintered material;

the wrap spring comprises steel;

the receiving element comprises a sintered material; and a difference between the melting temperatures is at least 200 degrees Celsius.

3. The blocking apparatus as claimed in claim 1, wherein a single thermocouple holds both ends of the wrap spring in the prestressed state with respect to the holding apparatus or holds the one end of the wrap spring in the prestressed state with respect to the holding apparatus; the other end of the wrap spring is fixed to the holding apparatus; or two thermocouples each hold one end of the wrap spring in the prestressed state with respect to the holding apparatus.

4. The blocking apparatus as claimed in claim 1, wherein:

the holding apparatus has two housing plates spaced apart from one another and each having through-openings in a region of the axis of rotation; and the holding apparatus includes a spacer element through which the housing plates are arranged at a distance with respect to one another defined by the spacer element.

5. The blocking apparatus as claimed in claim 4, wherein one of the housing plates contains a circular through-opening in which the receiving element is mounted.

6. The blocking apparatus as claimed in claim 5, further comprising a retaining element firmly mounted at one end in an opening of the other housing plate;

wherein the retaining element is surrounded by at least one winding of the wrap spring.

7. The blocking apparatus as claimed in claim 6, wherein:

the retaining element includes a counter bearing for rotatably receiving the receiving element;

at the contacting ends of the receiving element and the retaining element, in each case an edge or undercut set back in the circumferential direction is formed on a projection, and the projections overlap viewed in a radial direction.

8. The blocking apparatus as claimed in claim 7, wherein an edge or undercut set back in the circumferential direction is also formed on a respective projection at the other end of the receiving apparatus and/or holding apparatus.

9. The blocking apparatus as claimed in claim 6, wherein:

the receiving element, viewed in the direction of the axis of rotation, has the same length as the holding apparatus or these lengths differ by at most 30 percent with respect to the sum of the two lengths; the receiving element has a smaller external diameter than an external diameter of the holding apparatus; and the receiving element has an opening with a square cross-section, with a triangular cross-section or with a cross-section with more than four corners transversely to the axis of rotation.

10. The blocking apparatus as claimed in claim 1, wherein:

the wrap spring contains at least 5 windings;

two ends of the wrap spring are prestressed in the range of 5 angular degrees to 45 angular degrees with respect to one another;

the wrap spring has a square cross-section, a rectangular cross-section, or a circular cross-section; and the wrap spring comprises a helical spring with closely adjacent windings.

11. The blocking apparatus as claimed in claim 1, wherein:

at least one of the thermocouples is held between two housing plates;

the at least one of the thermocouples has an elongated shape compared to its largest lateral dimension; and a groove extends in a straight line along the at least one of the thermocouples for receiving one end or both ends of the wrap spring.

12. A blocking apparatus system, comprising:

a holding apparatus;

a receiving element rotatably mounted in the holding apparatus about an axis of rotation, the receiving element defining a through-opening with a through-axis coaxial or parallel to the axis of rotation;

a wrap spring held mechanically prestressed in the holding apparatus, with at least one winding arranged around the receiving element; and a thermocouple made of a material having a lower melting temperature than a lowest melting temperature in the holding apparatus and/or than a melting temperature of the wrap spring;

wherein the thermocouple holds at least one end of the wrap spring with respect to the holding apparatus in the prestressed state in such a way that the receiving element can be freely rotated in both drive directions about the axis of rotation; and the receiving element is blocked in one of the two drive directions in the relaxed state of the wrap spring and in the triggered state of a thermal fuse; and a fire damper;

wherein the blocking apparatus is arranged on a drive element of the fire damper; and the fire damper is to be kept closed in the event of a fire.

13. The blocking apparatus system as claimed in claim 12, further comprising a drive apparatus arranged on the drive element;

wherein the drive apparatus comprises a housing made of a material with a melting temperature lower than 800 degrees Celsius.

14. A method for blocking a drive direction of a drive element for a fire damper, the method comprising:

arranging a wrap spring around a drive shaft driven by a drive unit;

prestressing the wrap spring using a thermocouple;

wherein the thermocouple, in the event of a fire or in the event of overheating of a machine, decreases in strength or melts, with the prestressed wrap spring relaxing as a result;

wherein a material of the thermocouple has a lower melting temperature compared to a melting temperature of the wrap spring;

wherein the relaxed wrap spring has a smaller internal diameter than the prestressed wrap spring;

wherein the wrap spring, due to the reduced internal diameter, blocks rotation of the drive shaft in the drive direction, and allows it in an opposite direction of rotation.

* * * * *